US011047397B2

(12) United States Patent
Hayford et al.

(10) Patent No.: US 11,047,397 B2
(45) Date of Patent: Jun. 29, 2021

(54) GAS TURBINE ENGINE STATOR VANE MISTUNING

(71) Applicant: United Technologies Corporation, Farmington, CT (US)

(72) Inventors: Richard K. Hayford, Cape Neddick, ME (US); Robert J. Morris, Portland, CT (US); Charles H. Warner, South Portland, ME (US); Charles P. Gendrich, Middletown, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 946 days.

(21) Appl. No.: 15/110,889

(22) PCT Filed: Dec. 26, 2014

(86) PCT No.: PCT/US2014/072433

§ 371 (c)(1),
(2) Date: Jul. 11, 2016

(87) PCT Pub. No.: WO2015/112305

PCT Pub. Date: Jul. 30, 2015

(65) Prior Publication Data

US 2016/0333894 A1 Nov. 17, 2016

Related U.S. Application Data

(60) Provisional application No. 61/931,414, filed on Jan. 24, 2014.

(51) Int. Cl.
*F04D 29/66* (2006.01)
*F01D 25/06* (2006.01)
(Continued)

(52) U.S. Cl.
CPC ............. *F04D 29/668* (2013.01); *F01D 5/26* (2013.01); *F01D 9/041* (2013.01); *F01D 9/042* (2013.01);
(Continued)

(58) Field of Classification Search
CPC . F01D 5/26; F01D 9/041; F01D 9/042; F01D 25/06; F04D 29/688; F04D 29/542; F04D 29/544; F04D 29/666
See application file for complete search history.

(56) References Cited

U.S. PATENT DOCUMENTS 4,878,810 A * 11/1989 Evans ...................... F01D 5/16 416/203
5,286,168 A 2/1994 Smith
(Continued)

FOREIGN PATENT DOCUMENTS

EP 2599962 6/2013

OTHER PUBLICATIONS

The Extended European Search Report for EP Application No. 14879341.7, dated Oct. 20, 2017.
(Continued)

*Primary Examiner* — David E Sosnowski
*Assistant Examiner* — Sabbir Hasan
(74) *Attorney, Agent, or Firm* — Carlson, Gaskey & Olds, P.C.

(57) ABSTRACT

A gas turbine engine includes a circumferential array of stator vanes that have first and second vanes with different vibrational frequencies than one another. The first vanes are arranged in circumferentially alternating relationship with the second vanes.

12 Claims, 3 Drawing Sheets

66 60 66 74 62 68 64 70 72 82 84
A B A B A B A B A B A B A B A B A B A B

(51) Int. Cl.

| | |
|---|---|
| ***F01D 9/04*** | (2006.01) |
| ***F04D 29/54*** | (2006.01) |
| ***F01D 5/26*** | (2006.01) |

(52) U.S. Cl.

CPC .......... *F01D 25/06* (2013.01); *F04D 29/542* (2013.01); *F04D 29/544* (2013.01); *F04D 29/666* (2013.01); *F05D 2220/32* (2013.01); *F05D 2260/961* (2013.01); *Y02T 50/60* (2013.01)

(56) References Cited

U.S. PATENT DOCUMENTS

| | | | | |
|---|---|---|---|---|
| 5,524,341 | A | 6/1996 | Ferleger et al. | |
| 6,379,112 | B1 | 4/2002 | Montgomery | |
| 6,471,482 | B2 | 10/2002 | Montgomery et al. | |
| 6,814,543 | B2 | 11/2004 | Barb et al. | |
| 7,618,234 | B2 * | 11/2009 | Brackett | F01D 9/04 29/889.22 |
| 8,043,063 | B2 | 10/2011 | Kelly et al. | |
| 8,172,510 | B2 | 5/2012 | Duong et al. | |
| 8,834,098 | B2 * | 9/2014 | Glaspey | F01D 9/02 415/119 |
| 9,650,915 | B2 * | 5/2017 | Calza | F01D 5/16 |
| 2008/0193290 | A1 | 8/2008 | Brackett et al. | |
| 2012/0020789 | A1 | 1/2012 | Dijoud et al. | |
| 2013/0142659 | A1 | 6/2013 | Glaspey | |
| 2013/0149135 | A1 * | 6/2013 | Hield | F01D 9/041 415/208.2 |

OTHER PUBLICATIONS

International Search Report Written Opinion for International Application No. PCT/US2014/072433 dated Mar. 27, 2015.

International Preliminary Report on Patentability for PCT Application No. PCT/US2014/072433 dated Aug. 4, 2016.

* cited by examiner

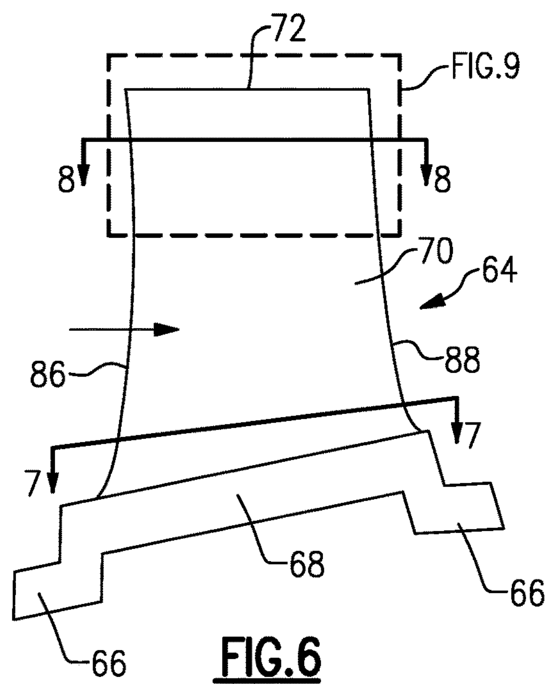
FIG.6
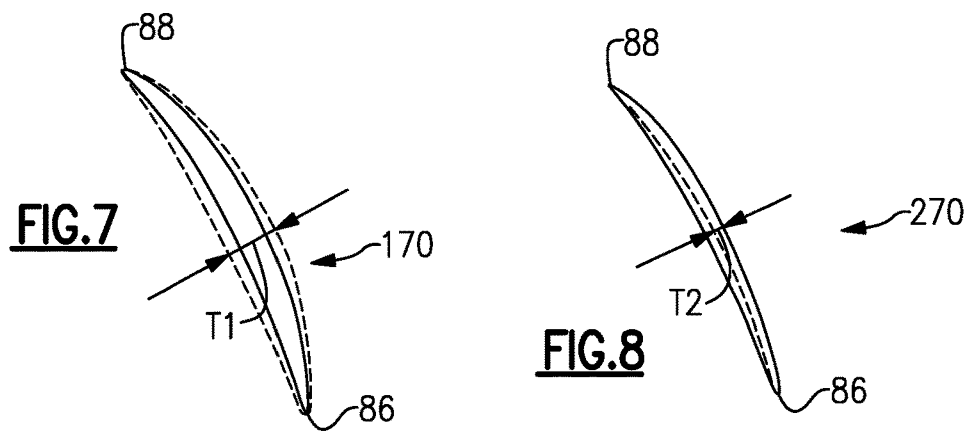
FIG.7
FIG.8
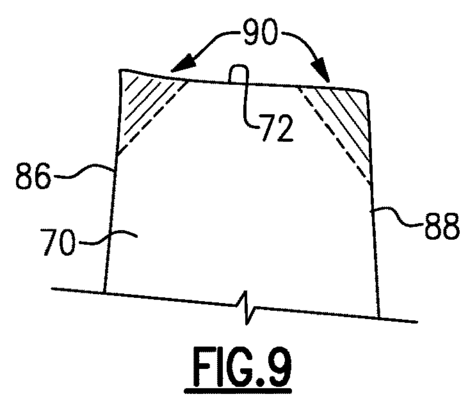
FIG.9

GAS TURBINE ENGINE STATOR VANE MISTUNING

CROSS-REFERENCE TO RELATED APPLICATIONS

This application claims priority to U.S. Provisional Application No. 61/931,414, which was filed on Jan. 24, 2014 and is incorporated herein by reference.

BACKGROUND

This disclosure relates to a stator vane array for a gas turbine engine.

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The compressor and turbine section includes circumferential arrangements of fixed and rotating stages. Structural vibratory coupling between adjacent airfoils can occur during engine operation. For rotating stages of the engine, blade mistuning has been used in which there are two sets of blades are arranged in circumferentially alternating relationship to provide an even numbered blade array. One set of blades has a different characteristic than the other set of blades to provide two different resonant frequencies. For fixed stages, vanes have been mistuned by providing different sets of vanes in adjacent quadrants of the array.

SUMMARY

In one exemplary embodiment, a gas turbine engine includes a circumferential array of stator vanes that have first and second vanes with different vibrational frequencies than one another. The first vanes are arranged in circumferentially alternating relationship with the second vanes.

In a further embodiment of the above, a compressor section is included in which the array is arranged in the compressor section.

In a further embodiment of any of the above, the compressor section includes low and high pressure compressors. The array is arranged in the high pressure compressor.

In a further embodiment of any of the above, the stator vanes are provided on multiple arcuate segments. Each segment includes the first and second vanes.

In a further embodiment of any of the above, the segments are approximately 180°.

In a further embodiment of any of the above, one segment includes N blades, and the other segment includes N+3 blades.

In a further embodiment of any of the above, the array includes an odd number of vanes. A pair of first vanes is arranged next to one another.

In a further embodiment of any of the above, at least one of the first and second vanes are cantilevered.

In a further embodiment of any of the above, the first and second vanes are integrated with an outer platform.

In a further embodiment of any of the above, the outer platform is supported by hooks relative to an outer case structure.

In a further embodiment of any of the above, the second vanes have an increased bending moment frequency of about 60% relative to the first vanes.

In a further embodiment of any of the above, the second vanes have an increased stiffness.

In a further embodiment of any of the above, the second vanes have a larger airfoil thickness compared to a first vane airfoil thickness.

In a further embodiment of any of the above, the first and second vanes have the same leading and trailing edge thicknesses.

In a further embodiment of any of the above, the first and second vanes have the same chord, stagger angle and span.

In a further embodiment of any of the above, the first vanes have a reduced mass at an inner diameter of the first vanes.

In a further embodiment of any of the above, at least one of a leading edge and a trailing edge is clipped at the inner diameter.

In a further embodiment of any of the above, a stiffness of the second vanes is increased and a mass of the first vanes is decreased.

In a further embodiment of any of the above, the first and second vanes are provided on a fully integrated ring.

In another exemplary embodiment, a stator vane stage includes a circumferential array of stator vanes that have first and second vanes. The first vanes are arranged in circumferentially alternating relationship with the second vanes. The second vanes have an increased bending moment frequency of about 6% relative to the first vanes.

BRIEF DESCRIPTION OF THE DRAWINGS

The disclosure can be further understood by reference to the following detailed description when considered in connection with the accompanying drawings wherein:

FIG. 6 is a schematic side elevational view of an example stator vane.

FIG. 7 is a cross-sectional view of the stator vane shown in FIG. 6 taken along line 7-7.

FIG. 8 is a cross-sectional view of the stator vane shown in FIG. 6 taken along line 8-8.

FIG. 9 is an enlarged view of an inner diameter portion of the stator vane shown in FIG. 6.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
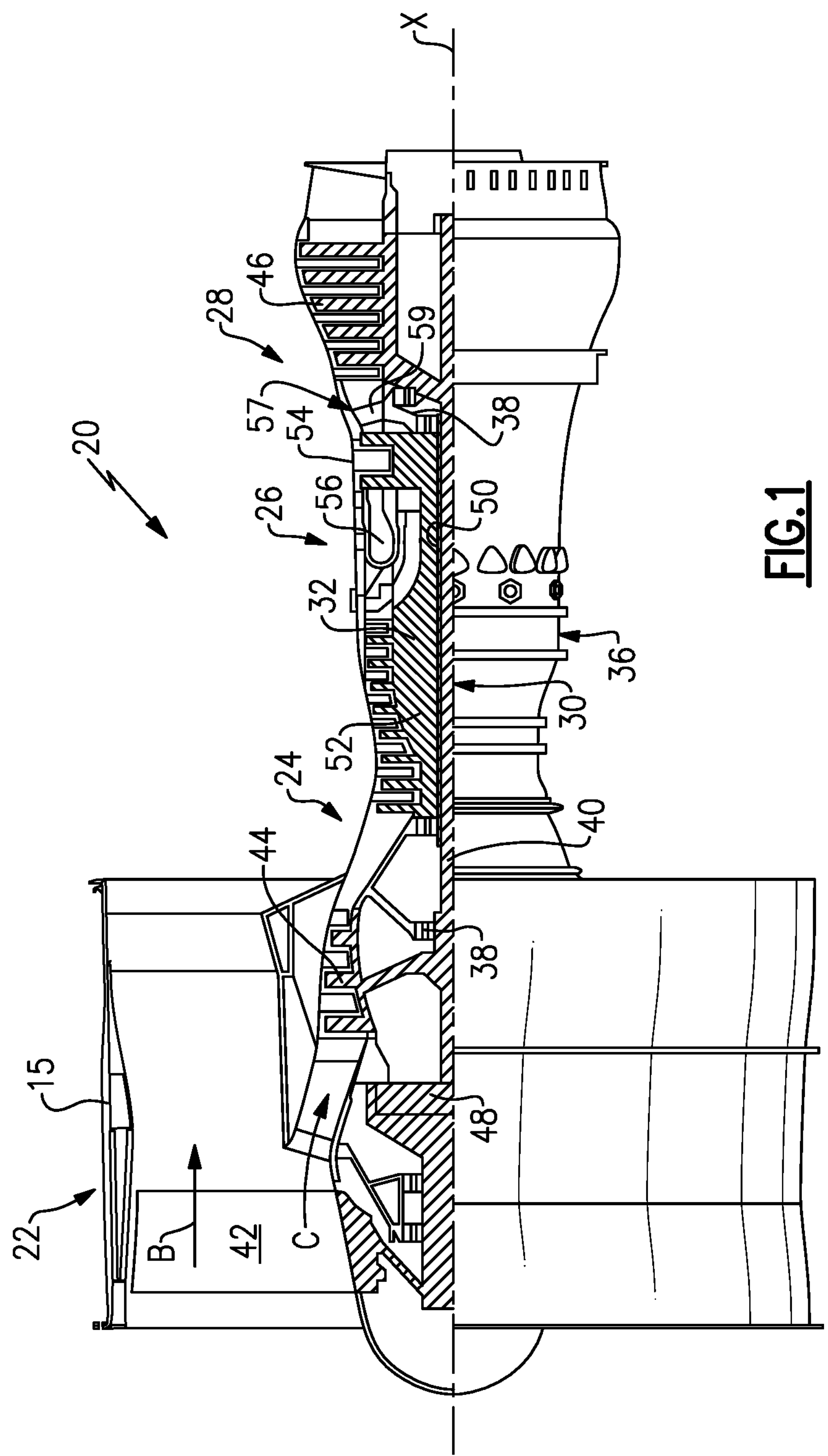
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis X which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram}\ ^\circ \text{R})/(518.7^\circ \text{R})]^{0.5}$. The "Low corrected fan tip speed" as disclosed herein according to one non-limiting embodiment is less than about 1150 ft/second.

Figure 2:
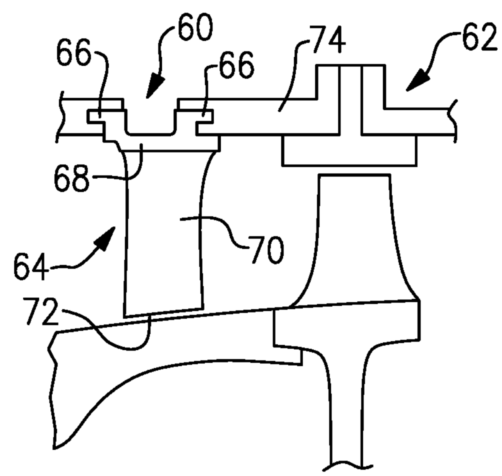
FIG. 2 is a schematic view through an engine section including a fixed stage and a rotating stage.
Figure 5A:
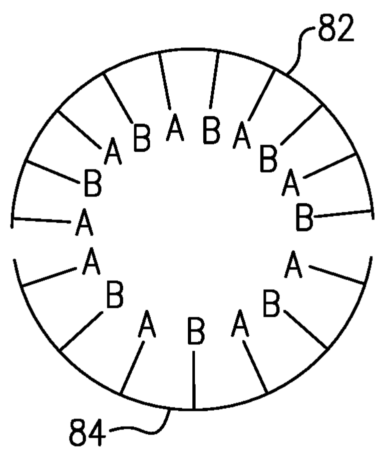
FIG. 5A illustrates a segment having N blades and another segment having N+3 blades.

Referring to FIG. 2, a portion of an engine section is shown, for example, a compressor section. It should be understood, however, that disclosed section also may be provided in a turbine section.

The section includes a fixed stage 60 that provides a circumferential array of vanes 64 arranged axially adjacent to a rotating stage 62. In the example, the vane 64 includes an outer diameter portion 68 having hooks 66 that support the array of vanes 64 with respect to a case structure 74. An airfoil 70 extends radially from a platform of the outer diameter portion 68. In the examples that are illustrated, the vanes 64 are of the cantilevered type in which an inner diameter portion 72 of the airfoil 70 is unsupported. It should be understood that the disclosed vane arrangement could be used for vane structures having a platform at the inner diameter portion of the airfoil.

Figure 3:
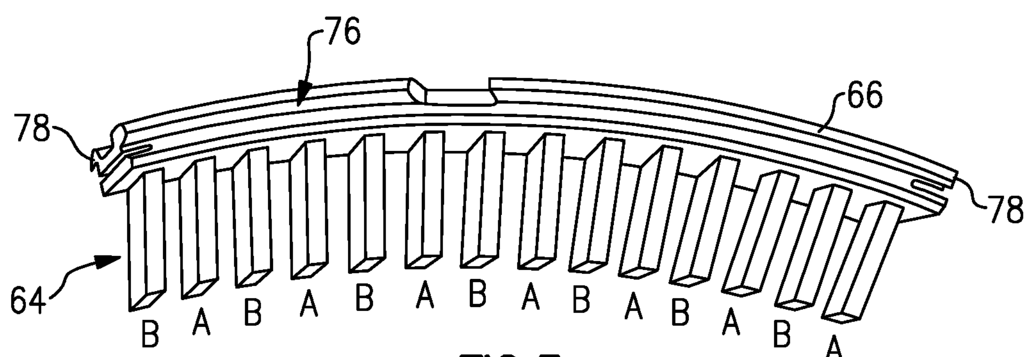
FIG. 3 is a perspective view of a segment of stator vanes having first and second vanes arranged in circumferentially alternating relationships with one another.

The vanes 64 may be arranged in a cluster to provide an arcuate vane segment 76, as shown in FIG. 3. Circumferential ends 78 of adjacent segments 76 are sealed relative to one another. The vane segment 76 includes first vanes A and second vanes B that are arranged in an alternating relationship with the first vanes A. The vanes 64 have chord, stager angle and span parameters. The first and second vanes A, B have different vibration frequencies than one another to mistune the array of vanes and reduce the structural and aerodynamic coupling between adjacent vanes. As a result, the airfoil resonant vibration response, the vibration response after engine compressor stall from aerodynamic separation induced vibration, and the airfoil aero-elastic flutter vibration response all may be reduced.

Figure 4:
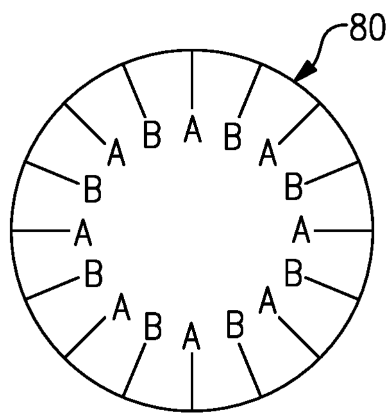
FIG. 4 is a schematic view of a full ring of stator vanes.
Figure 5:
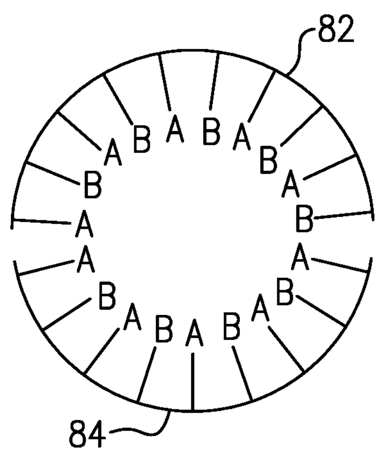
FIG. 5 is a schematic view of first and second segments of stator vanes.

The array of stator vanes may be provided as a full ring 80, as shown in FIG. 4, or ring halves 82, 84 as shown in FIG. 5. An odd number of vanes may be provided in a segment, such that the same vane of adjacent segments would be arranged next to each other, as shown in FIG. 5

(see adjacent vanes A-A). In one example, the first half 82 includes N number of blades, and the second half 84 includes N+3 blades.

Referring to FIG. 6, the vane 64 includes leading and trailing edges 86, 88. The second vanes B may include an increased bending moment frequency of about 6% relative to the first vanes A. In another embodiment, the second vanes B may include an increased bending moment frequency of up to 60% relative to the first vanes A, and in another example about 6% relative to the first vanes. The second vanes B may also have an increased torsional frequency relative to the vanes A. This may be achieved in a variety of suitable manners. For example, the first and second vanes A, B may have different microstructures than one another. In another example, the second vanes may have an airfoil 170 with an increased stiffness, for example, by providing a larger airfoil thickness (dashed lines in FIG. 7) compared to an airfoil thickness of the first vanes (solid line in FIG. 7). However, it is desirable to maintain the same leading and trailing edge thicknesses, chord, stager angle and span of the first and second vanes, A, B. Another way of increasing the relative bending moment frequency of the second vanes is to reduce the mass of airfoil 270 of the first vane A, for example, by reducing the thickness and mass at the inner diameter portion 72 (dashed lines relative to solid lines in FIG. 8). This also may be achieved by clipping off one or more corners 90 at least of one of the leading and trailing edges 86, 88 at the inner diameter portion 72, as shown in FIG. 9. A combination of the stiffening or reducing mass may be used to change the relative bending moments of the first and second vanes A, B.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine comprising:

a circumferential array of stator vanes having first and second vanes with different vibrational frequencies than one another, the first vanes arranged in circumferentially alternating relationship with the second vanes, wherein the first vanes and the second vanes are cantilevered.

2. The gas turbine engine according to claim 1, wherein the first and second vanes are integrated with an outer platform.

3. The gas turbine engine according to claim 2, wherein the outer platform is supported by hooks relative to an outer case structure.

4. The gas turbine engine according to claim 1, wherein the first vanes and the second vanes are provided on a fully integrated ring.

5. The gas turbine engine according to claim 1, wherein the second vanes have an increased bending moment frequency of about 6% relative to the first vanes.

6. A gas turbine engine comprising:

a circumferential array of stator vanes having first and second vanes with different vibrational frequencies than one another, the first vanes arranged in circumferentially alternating relationship with the second vanes, wherein the second vanes have an increased stiffness relative to the first vanes, and the second vanes have a larger airfoil thickness compared to an airfoil thickness of the first vanes.

7. The gas turbine engine according to claim 6, wherein the second vanes have an increased torsional frequency and a bending moment frequency of up to 60% relative to the first vanes.

8. The gas turbine engine according to claim 7, wherein the first vanes have a reduced mass at an inner diameter of the first vanes compared to an outer diameter of the first vanes.

9. The gas turbine engine according to claim 8, wherein at least one of a leading edge and a trailing edge is clipped at the inner diameter.

10. The gas turbine engine according to claim 7, wherein a stiffness of the second vanes is greater than that of the first vanes, and a mass of the first vanes is less than the that of the second vanes.

11. The gas turbine engine according to claim 6, wherein the first and second vanes have the same leading and trailing edge thicknesses.

12. The gas turbine engine according to claim 6, wherein the first and second vanes have the same chord, stagger angle and span.

* * * * *